US010530793B2

(12) United States Patent
Galula et al.

(10) Patent No.: US 10,530,793 B2
(45) Date of Patent: Jan. 7, 2020

(54) SYSTEM AND METHOD FOR DETECTION AND PREVENTION OF ATTACKS ON IN-VEHICLE NETWORKS

(71) Applicant: Argus Cyber Security Ltd., Tel Aviv (IL)

(72) Inventors: Yaron Galula, Kadima (IL); Ofer Ben-Noon, Rishon-LeZion (IL); Oron Lavi, Kfar Saba (IL)

(73) Assignee: Argus Cyber Security Ltd., Tel Aviv (IL)

( * ) Notice: Subject to any disclaimer, the term of this patent is extended or adjusted under 35 U.S.C. 154(b) by 83 days.

(21) Appl. No.: 15/636,678

(22) Filed: Jun. 29, 2017

(65) Prior Publication Data

US 2018/0007076 A1     Jan. 4, 2018

Related U.S. Application Data

(60) Provisional application No. 62/356,052, filed on Jun. 29, 2016.

(51) Int. Cl.
*H04L 29/06* (2006.01)
*G06F 21/85* (2013.01)
(Continued)

(52) U.S. Cl.
CPC .......... *H04L 63/1425* (2013.01); *G06F 21/85* (2013.01); *H04L 12/40013* (2013.01); *H04L 63/0254* (2013.01); *H04L 63/10* (2013.01); *H04L 63/123* (2013.01); *H04L 63/1466* (2013.01); *H04L 67/12* (2013.01); *H04L 67/22* (2013.01); *H04L 69/40* (2013.01); *H04L 63/1408* (2013.01); *H04L 63/1433* (2013.01);
(Continued)

(58) Field of Classification Search
CPC ....... H04L 63/04; H04L 63/18; H04L 45/306; H04L 67/18; H04L 63/166; H04L 67/22; H04L 67/141; H04L 65/1066
See application file for complete search history.

(56) References Cited

U.S. PATENT DOCUMENTS 7,571,343 B1    8/2009 Xiang et al.
9,282,116 B1 *  3/2016 Rovniaguin ........ H04L 63/1458
(Continued)

OTHER PUBLICATIONS

European Office Action of Application No. 17178664.3 dated Feb. 5, 2019.
(Continued)

*Primary Examiner* — Tri M Tran
(74) *Attorney, Agent, or Firm* — Pearl Cohen Zedek Latzer Baratz LLP

(57) ABSTRACT

Systems and methods for detection of attacks on a communication authentication layer of an in-vehicle network, including determining, by at least one network node, at least one attack attempt on the communication authentication layer of the in-vehicle network, wherein the determination is carried out by identifying anomalies in at least one of messages, data and metadata directed to the communication authentication layer, and selecting, by the at least one network node, a response corresponding to the determined attack attempt from at least one of modification of parameter values corresponding to a security protocol, a failsafe response, and rejection of messages identified as anomalies.

17 Claims, 5 Drawing Sheets

(51) Int. Cl.
*H04L 29/08* (2006.01)
*H04L 12/40* (2006.01)
*H04L 29/14* (2006.01)
*H04W 4/48* (2018.01)

(52) U.S. Cl.
CPC ..... *H04L 2012/40215* (2013.01); *H04W 4/48* (2018.02)

(56) References Cited

U.S. PATENT DOCUMENTS

| | | |
|---|---|---|
| 2009/0177675 A1 | 7/2009 | Trumbull et al. |
| 2013/0263268 A1* | 10/2013 | Kim .................... H04L 63/1458 726/23 |
| 2015/0113638 A1* | 4/2015 | Valasek ............... H04L 63/1408 726/22 |
| 2015/0271201 A1 | 9/2015 | Ruvio et al. |

OTHER PUBLICATIONS

European Search Report of Application No. 17178664.3 dated Nov. 9, 2017.

* cited by examiner

SYSTEM AND METHOD FOR DETECTION AND PREVENTION OF ATTACKS ON IN-VEHICLE NETWORKS

CROSS REFERENCE TO RELATED APPLICATION

This application claims the benefit of Application No. 62/356,052, filed Jun. 29, 2016, which is incorporated herein by reference.

FIELD OF THE INVENTION

The present invention relates to prevention of cyber-attacks. More particularly, the present invention relates to systems and methods for detection and prevention of attacks on in-vehicle networks.

BACKGROUND OF THE INVENTION

One of the security layers used for automotive in-vehicle networks is secure on-board communication (SecOC). This security measure may add an authentication layer on top of existing in-vehicle messages and communication. An example of a SecOC specification can be found in the automotive open system architecture ("AUTOSAR") specification. It should be appreciated that SecOC is given hereinafter as an example of message authentication schemes, while other schemes may also be utilized.

In-vehicle networks allow internal communication between various components of a vehicle (e.g., air conditioning system, diagnostics, engine, etc.) by communicating with different electronic control units (ECUs). An electronic control unit gets input from sensors (e.g., speed, temperature, pressure, etc.) to be used in its analysis and exchange data among themselves during the normal operation of the vehicle. For example, the engine needs to tell the transmission what the engine speed is, and the transmission needs to tell other modules when a gear shift occurs. The in-vehicle network allows exchanging data quickly and reliably, with internal communication between the ECUs.

SecOC may be based on a shared secret (or encoded message) between at least the sender and the receiver. The sender may use this shared secret in order to generate a message authentication code (MAC) and add it to the relevant messages. The receiver may validate the MAC in order to make sure it was sent by the sender.

This MAC may result in a hash function or any other function over parts of the message and other metadata. For example, the hash may be calculated over the shared secret and the message data. A freshness value may also be used in the MAC calculation in order to prevent possible attackers from performing replay attacks. This freshness value may include a time stamp. This freshness value may include a counter. The MAC may include a truncation of the original hash function result due to packet size limits on the in-vehicle network.

SecOC implementation may use a secure time mechanism in order to derive the proper time for the calculation of the freshness value while keeping the sender and the receiver in sync. Additionally, SecOC implementations may also rely on a key exchange mechanism in order to derive the shared secrets.

SecOC may be used to secure the critical and valuable processes in the vehicle. Therefore, tampering with SecOC implementations may cause substantial damage from a single point of failure in the system. However, the SecOC security layer may also be compromised, for example, in order to either allow malicious messages to be treated as if they are authenticated or to block legitimate in-vehicle communication.

SUMMARY OF THE INVENTION

There is thus provided, in accordance with some embodiments of the invention, a method of detecting attacks on a communication authentication layer of an in-vehicle network, the method including determining, by at least one network node, at least one attack attempt on the communication authentication layer of the in-vehicle network, wherein the determination is carried out by identifying anomalies in at least one of messages, data and metadata directed to the communication authentication layer, and selecting, by the at least one network node, a response corresponding to the determined attack attempt, said response selected from at least one of: modification of parameter values corresponding to a security protocol, a failsafe response, and rejection of messages identified as anomalies.

In some embodiments, the at least one network node may count the number of valid messages and the number of invalid messages received by the node during a predefined time interval, wherein the response may be selected if the number of valid messages is less than a first threshold and the number of invalid messages is greater than a second threshold for the predefined time interval. In some embodiments, the at least one network node may count the number of valid messages and the number of invalid messages received by the node during a predefined time interval, wherein the response may be selected in accordance with a ratio of number valid messages to number of invalid messages.

In some embodiments, the response may be selected in accordance with the number of received messages of a predetermined type being greater than a third threshold during the predefined time interval. In some embodiments, a message may be identified as an anomaly based on identification, in the message, of a code from a previously received message. In some embodiments, a message may be identified as an anomaly based on identification of a change in a frequency of received messages, wherein the change in frequency exceeds a predefined threshold.

In some embodiments, a confidence level of a message being valid may be determined based on a code in the message and based on one or more codes included in one or more previously received messages, wherein if the confidence level is below a confidence level threshold the message is identified as an anomaly. In some embodiments, at least one pattern of messages may be determined, wherein the response may be selected in accordance with determination of a predetermined pattern of messages characterized by at least one of: a sequence of message types and a time interval between messages. In some embodiments, the response may be selected in accordance with determination of a pattern of messages being different from a predetermined pattern. In some embodiments, the response may be selected in accordance with detection of a deviation from an expected behavior, wherein the deviation is detected based on at least one of: a timing model and a content model.

In some embodiments, a message may be sent to at least one node of the network, wherein the sent message includes at least one of: an indication of a detected security risk and an indication of the selected response. In some embodiments, the sent message may further include an indication of the type of the identified anomaly.

In some embodiments, a predefined normal mode response may be selected based on identification of at least one of: a predefined event, a predefined time interval and a predefined command. In some embodiments, at least one of a) logging a message identified as an anomaly, b) blocking a message identified as an anomaly, and c) sending a signal on a communication bus to cause network nodes to disregard the message may be performed. In some embodiments, the response may be selected in accordance with detection of a deviation from an expected time value progression in a plurality of secured time messages.

There is thus provided, in accordance with some embodiments of the invention, a system for detection of attacks on a communication authentication layer of an in-vehicle network, including at least one processor, and at least one electronic control unit, coupled to the processor and configured to communicate with the processor via the communication authentication layer. In some embodiments, the processor may be configured to determine at least one attack attempt on the communication authentication layer by identifying anomalies in at least one of messages, data and metadata directed to the communication authentication layer, and wherein the processor is configured to respond to an attack attempt by at least one response selected from: modification of parameter values corresponding to a security protocol, a failsafe response, and rejection of messages identified as anomalies. In some embodiments, the system may further include a communication module, coupled to the processor and configured to communicate with external devices. There is also provided in accordance with some embodiments of the invention a computer readable medium comprising instructions which, when implemented on a processor in a vehicle communication system, cause the processor to implement the steps of any of the methods described herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
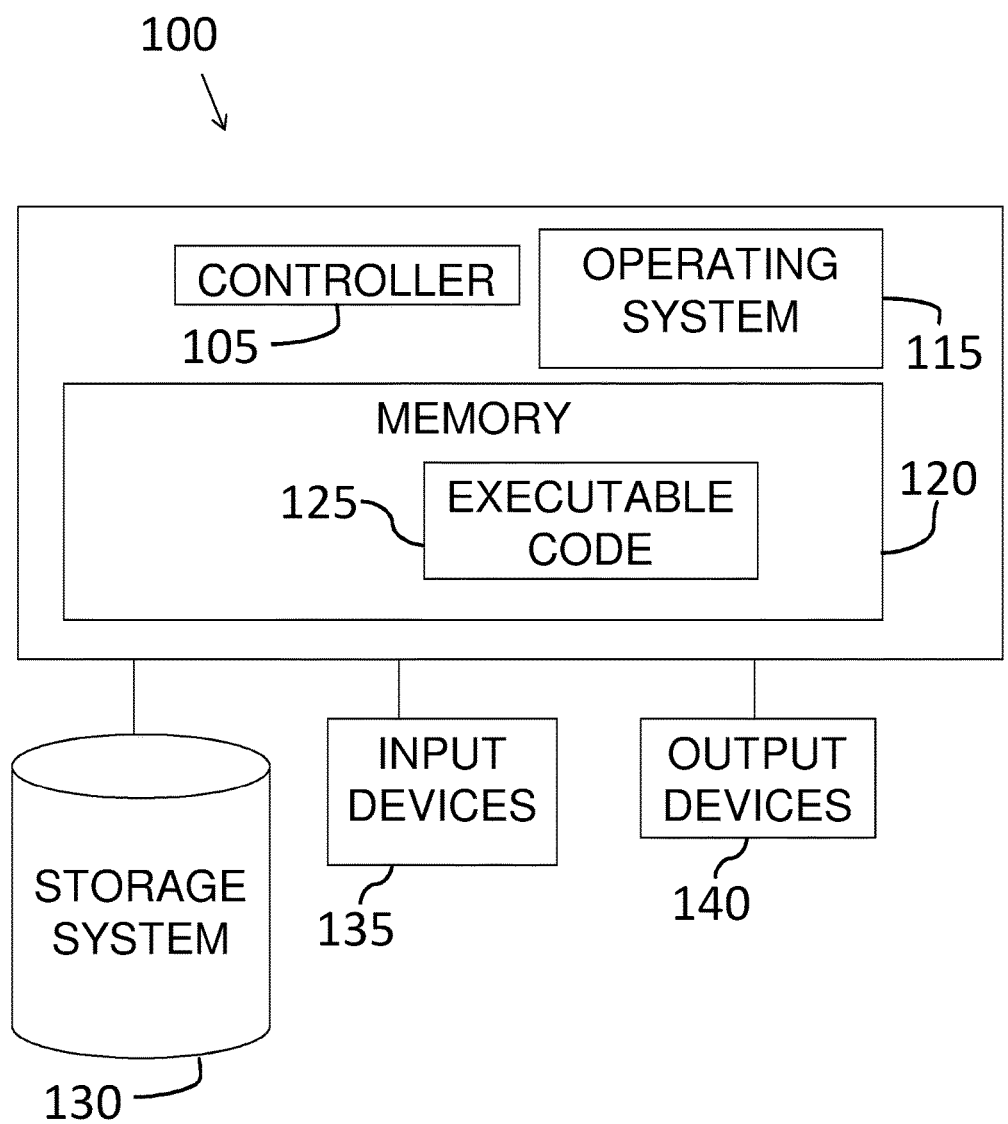
FIG. 1 shows a block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which shows a block diagram of an exemplary computing device, according to some embodiments of the invention. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA) and/or system on a chip (SOC) that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein, for example, cyber-attacks on in-vehicle networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate, with control or other units in a vehicle, e.g., input and/or output devices or components 135 and 140 may include ports that enable device 100 to communicate with an engine control unit, a suspension control unit, a traction control and the like.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board, or in-vehicle, system or network, a plurality of chips, FPGAs or SOCs, a plurality of computer or network devices, or any other suitable computing device. For example, a system as described herein may include one or more devices such as computing device 100.

According to some embodiments, attacks using the secure on-board communication (SecOC) to block legitimate messages may be prevented by allowing network nodes to go into a failsafe mode in which the attacks may be stopped using the SecOC mechanism, for instance under limiting conditions. Additional solutions may allow detection and/or prevention of replay and MAC guessing attacks, as well as methods to allow maintain secure time and/or freshness in the in-vehicle network. In some embodiments, attack attempts may be carried out on the communication authentication layer (e.g., SecOC) of in-vehicle networks to disable and/or to bypass the communication authentication layer.

Figure 2:
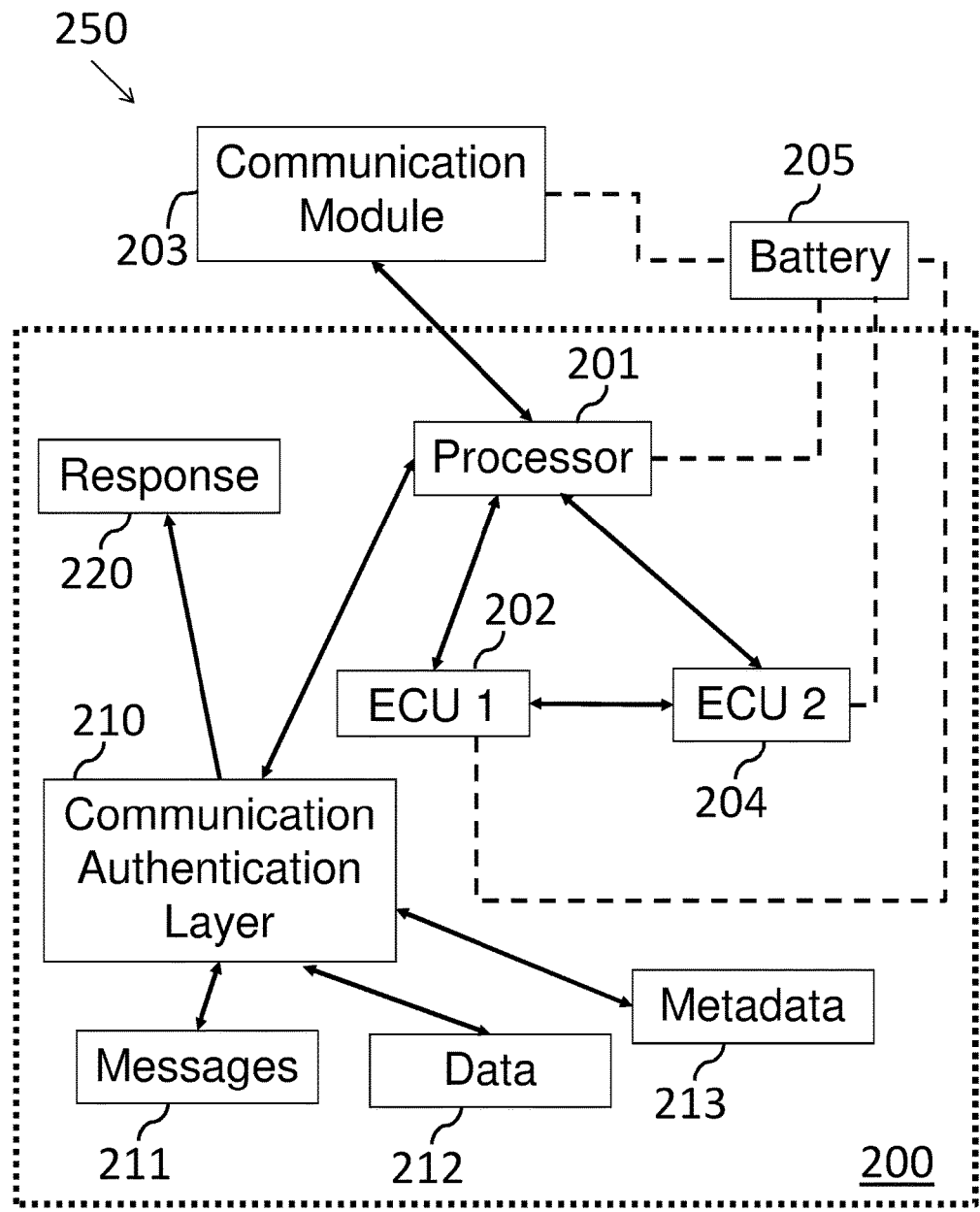
FIG. 2 shows a block diagram of a system for detecting attacks on in-vehicle networks, according to some embodiments of the invention.

Reference is made to FIG. 2, which shows a block diagram of a system for detecting attacks on in-vehicle networks, according to some embodiments of the invention. In some embodiments, such a system 250 may be embedded into an in-vehicle network 200 (or vehicle bus), for instance integrated into a vehicle electronic control unit (ECU) in order to detect attacks on the in-vehicle network 200.

In-vehicle network 200 may include a processor 201 (e.g., such as controller 105 shown in FIG. 1) in communication with other components of in-vehicle network 200 (where communication is indicated with arrows in FIG. 2). In some embodiments, communication between components of in-vehicle network 200 may be carried out with secure on-board communication (SecOC) as a communication authentication layer 210. It should be noted that while SecOC is described as an example of the communication authentication layer 210, other authentication layers may also be used. In some embodiments, communication authentication layer 210 may check authentication on at least one of messages 211, data 212 and metadata 213.

Processor 201 may be coupled to at least one ECU 202, 204 and analyze operations of ECUs coupled thereto. It should be noted that each of processor 201 and ECUs 202, 204 coupled thereto may be considered as a node of the in-vehicle network 200. In some embodiments, communication between nodes of in-vehicle network 200 may be carried out at least partially with wireless communication (e.g., via Bluetooth). In some embodiments, in-vehicle network 200 may further include a communication module 203 configured to allow wireless communication with external devices, for example to allow a navigation system to communicate with satellites and/or to allow receiving messages (e.g., a time stamp) from external sources. In some embodiments, in-vehicle network 200 may further include a battery 205 (e.g., the battery of the vehicle) to power components of the in-vehicle network 200.

According to some embodiments, at least one node of in-vehicle network 200 may analyze and/or process data to detect attacks on the in-vehicle network 200. In some embodiments, at least one computing device (such as device 100, as shown in FIG. 1) may be embedded into in-vehicle network 200 and process data from the network to detect attacks on the in-vehicle network 200.

In some embodiments, at least one computing device (such as device 100, as shown in FIG. 1) may be embedded into at least one node of in-vehicle network 200 and process data from that node and/or from the network to detect attacks on the in-vehicle network 200.

In some embodiments, problems associated with SecOC implementations at in-vehicle network 200 may include interfering (e.g., by an attacker) with any part of the SecOC mechanism, that may cause the receiver to discard packets involved in this communication (which may be critical for vehicle operation) because the MACs may not appear valid to the receiver. Accordingly, the attacker may attack the SecOC mechanism in order to disable communications in the in-vehicle network 200 and possibly harm the operation of the vehicle. In some embodiments, authentication layer data may be sent on a separate message, for instance on a message sent after or before the message carrying the data to be sent. For example, the MAC may be sent on a secondary message.

According to some embodiments, a node of the in-vehicle network 200 (e.g., at least one of processor 201 and ECU 202, 204) may determine communication authentication on at least one of messages 211, data 212 and metadata 213 with communication authentication layer 210 and provide a corresponding response 220 in case that an anomaly is identified.

According to some embodiments, on board diagnostics (OBDII) dongle that generates an alert once removed may be used for detecting attacks of in-vehicle networks, for instance coupled to processor 201 and/or coupled to communication module 203. OBDII dongles may be used for a variety of reasons in the automotive industry. An OBDII dongle may also be used to cover the OBDII port and prevent attackers with physical access to the car from connecting a malicious component to the OBDII port and use it to communicate with the in-vehicle network components.

In some embodiments, an OBDII cover dongle may utilize a communication system in order to send a signal or alert to the car owner or to a central management console once it is removed from the OBDII port. The dongle may identify that it is removed from the port by detecting that the power supply is no longer connected to the dongle. In some embodiments, the dongle may detect it by detecting that the vehicle network is no longer accessible.

In some embodiments, the dongle may send this signal or alert using an on board communication system. In some embodiments, this may include a modem. In some embodiments, this may include a cellular device. In some embodiments, this may include a Wi-Fi module. In some embodiments, this may include a Bluetooth module. In some embodiments, the dongle may include an on board power supply in order to allow it to send the signal even after it is removed from the OBDII power supply.

Figure 3A:
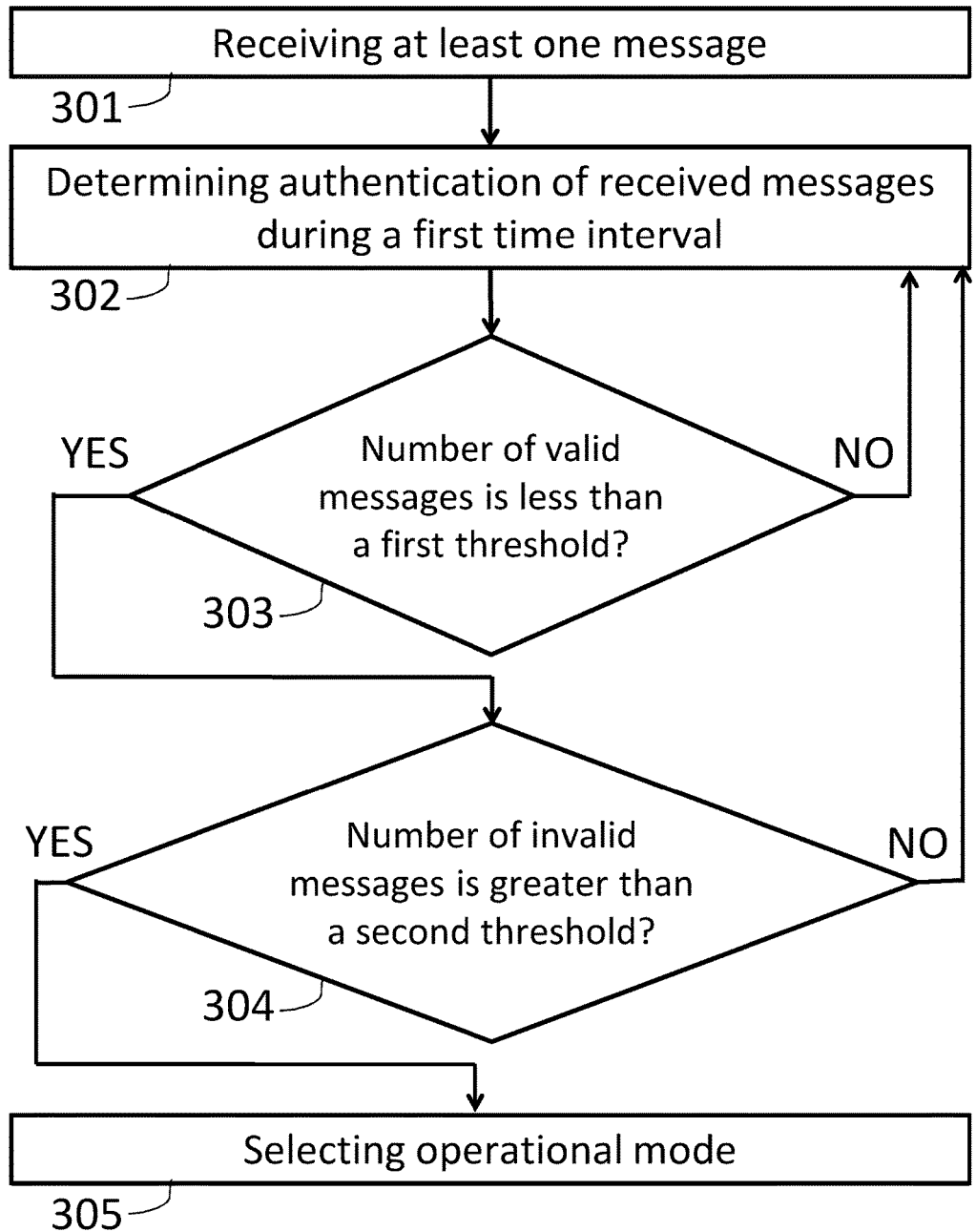
FIG. 3A shows a flowchart of a method of detecting attacks on in-vehicle networks, according to some embodiments of the invention.
Figure 3B:
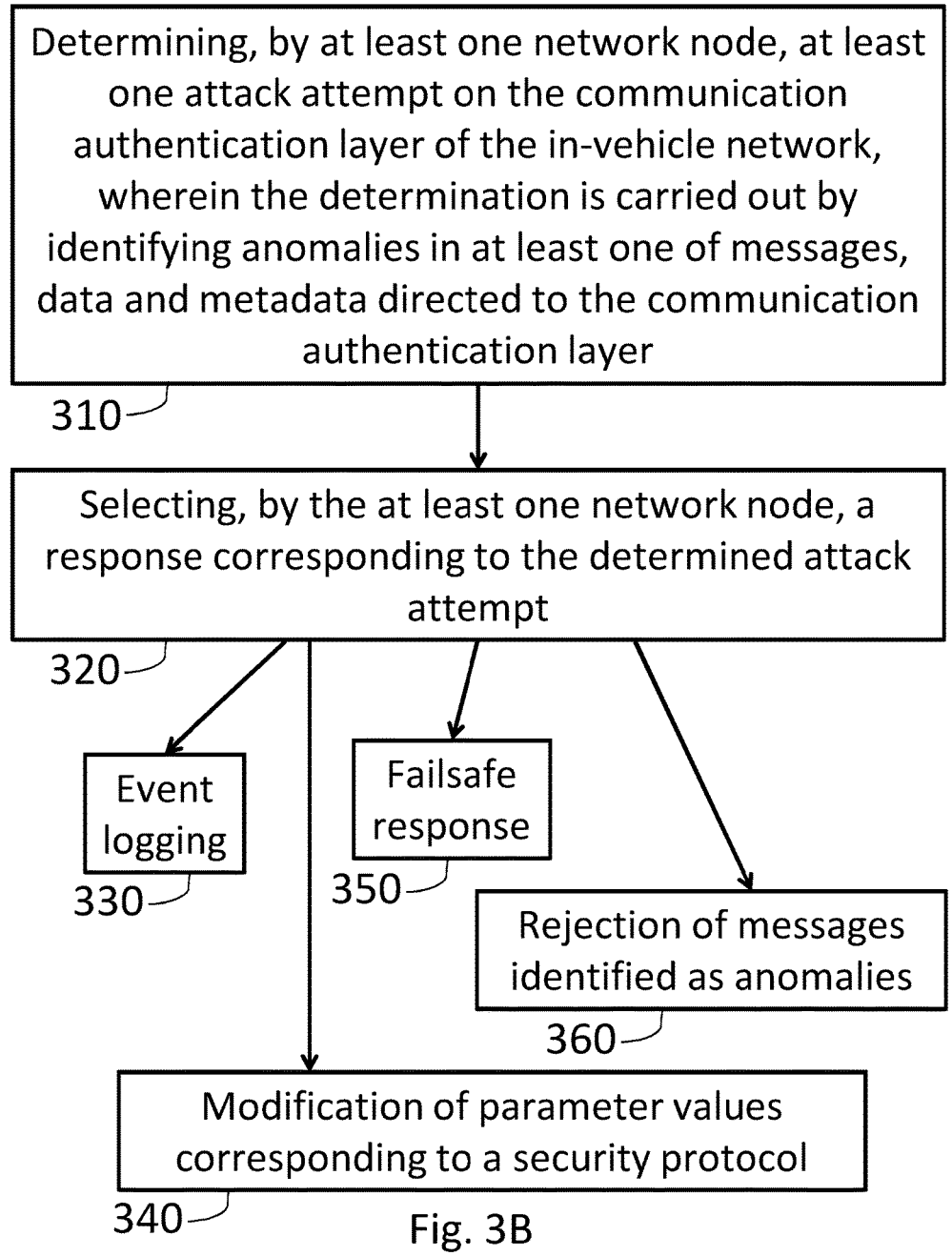
FIG. 3B shows a flowchart of a method of detecting attacks on in-vehicle networks, according to some embodiments of the invention.

Reference is made to FIGS. 3A-3B, which show flow-charts of a method of detecting attacks on in vehicle networks, according to some embodiments of the invention. In some embodiments, the method of detecting attacks on in vehicle networks may be performed by computing device 100 (as shown in FIG. 1) or by any other computation device embedded at in-vehicle network 200 (as shown in FIG. 2).

In some embodiments, at least one message may be received 301 at a node of the in-vehicle network 200, for instance received by processor 201 and/or by ECU 202 (as shown in FIG. 2). For example, the received message may include time data and/or location data. In some embodiments, messages may be received 301 from an external source, for instance via communication module 203.

In some embodiments, validity of received messages during a first time interval may be determined 302, for instance based on identification, in the received message, of a code from a previously received message. The validity may be determined 302 by a node of in-vehicle network 200 and/or determined by a computing element embedded into in-vehicle network 200. Once validity of received messages during the first time interval is determined, the number of valid and/or invalid messages may be counted for instance by a processor of in-vehicle network 200 such as processor 201 and/or processor of ECU 202.

In case that the number of valid messages is less than a first threshold 303, processor of in-vehicle network 200 may check if the number of invalid messages is greater than a second threshold 304. In case that the number of invalid messages is greater than a second threshold 304, an anomaly may be determined and the operational mode of the system may be selected 305.

In case that the number of valid messages is not less than a first threshold 303 and/or that the number of invalid messages is not greater than a second threshold 304, the system may return to determining validity of received messages until the number of valid messages and invalid messages corresponds to the predetermined first and second thresholds respectively.

In some embodiments, the detection of attacks may include selection of operation in a failsafe mode. In some embodiments, a node of in-vehicle network 200 (e.g., an ECU) involved in the SecOC communication may utilize a failsafe mechanism to allow continuous operation. Once engaged, the failsafe mode may allow the node to disregard the SecOC MAC validation and accept all messages under certain circumstances, as further described hereinafter. In some embodiments, failsafe mode (or response) may allow the node to disregard the SecOC MAC validation of only some of received messages. For example, a node may engage the failsafe mode after receiving more than a predefined number of invalid messages, while receiving less than a predefined number of valid messages.

According to some embodiments, the method of detecting attacks on in-vehicle networks (as shown for example in FIG. 3B) may include determining 310, by at least one network node, at least one attack attempt on the communication authentication layer of the in-vehicle network, wherein the determination is carried out by identifying anomalies in at least one of messages, data and metadata directed to the communication authentication layer, and selecting 320, by the at least one network node a response corresponding to the determined attack attempt. In some embodiments, the selected operational mode may include at least one of event logging 330, modification of parameter values corresponding to a security protocol 340, failsafe response 350, and rejection of messages 360 identified as anomalies. In some embodiments, the authentication of at least one received message to determine invalid messages may include at least one of determining number of valid messages and number of invalid messages exceeding a predetermined threshold, identification of code in a message that was included in a previously received message, and detection of lack of synchronization of the messages.

In some embodiments, a node may engage the failsafe mode upon detecting a predetermined message pattern. For example, the pattern may include the ratio of the number of valid and the number of invalid messages over a predefined time window. In another example, the pattern may be the ratio of number of invalid message and the number of other in-vehicle messages, for instance not directly sent to this node. In some embodiments, the pattern may be any pattern that is indicative of an anomaly in the in-vehicle network 200. For example, the anomaly may be a deviation from the expected behavior of a specific in-vehicle message and/or a deviation from the expected behavior of the secure time message. In some embodiments, a deviation from expected behavior may be based on a timing model of the message and/or based on a content model of a message.

In some embodiments, the node may detect that the secure time message is sent more frequently than it should be and thereby may cause the node to engage the failsafe mode. In another example, a node may detect that the secure time, as described by the secured time message, is not behaving according to the real time as measured by the node over a period of a predefined time window.

In some embodiments, a node may engage the failsafe mode upon detecting more than a predefined number of a certain type of messages on the in-vehicle network 200. This detected type may be in some embodiments also any kind of message. Another example may be that this expected type may be a sub set of messages. For example, this sub set of messages may be a predefined message identifier (ID). In some embodiments, the predefined message ID may be a secure time broadcast message and/or a network management message. Another example may be that the node may engage the failsafe mode after receiving more than a predefined number of invalid messages while receiving more than another predefined number of in-vehicle messages, for instance in a predefined time window. In some embodiments, such in-vehicle messages may not be directly sent to the node (e.g., initially sent to a different node coupled thereto).

In some embodiments, not all messages may be secured with the SecOC mechanism, and the node may engage the failsafe mode after receiving more than a predefined number of invalid SecOC messages while receiving more than a predefined number of non SecOC secured messages in a predefined time window.

In some embodiments, when analyzing incoming messages and looking for the detection pattern or any other logic that the node may use in order to determine whether to engage the failsafe mode, the node may only consider messages that are received in a valid rate. In some embodiments, the node may ignore message that are received at a rate that exceeds a predefined threshold for the purpose of blocking an attacker from causing the node to engage the failsafe mode intentionally.

Once a node engages the failsafe mode, it may notify other nodes in the network about it. In some embodiments, the node may notify a monitoring hub that resides outside of the vehicle about engaging the failsafe mode. In some embodiments, the node may notify the vehicle operator about engaging the failsafe mode.

In some embodiments, the node may leave the failsafe mode after a predefined time period. In some embodiments, the node may leave the failsafe mode after the vehicle is shut down. In some embodiments, the node may stay in failsafe mode until instructed otherwise. For example, the node may leave the failsafe mode after being serviced at the car dealership.

In some embodiments, the failsafe mode may include, either instead of disregarding the SecOC layer or in addition to, a reset of the parameters used as a part of the SecOC mechanism. For example, this may include a reset of the freshness values used in the vehicle. In another example, this may include a reset of the secure time. In a further example, this may initiate a process that may generate and/or distribute a new set of shared encrypted messages (or secrets) to the relevant network nodes.

In some embodiments, a replay protection operational mode may be engaged. The SecOC mechanism may allow for an acceptance window in which SecOC messages may be considered valid although the freshness value associated with them does not match the current freshness value kept by the receiving network node. For example, this may indicate that a receiving node may accept a message that carries a timestamp value that is one second behind the current time as measured by the receiving node. This behavior may allow an attacker to intercept a valid SecOC message and replay to it one or more times as long as it is inside the acceptance window. Such packets may be verified by the receiver as valid and may potentially cause damage to the vehicle system. In some embodiments, replay of messages (for instance an attacker may record messages and retransmits them) may be determined that based on content of messages (e.g., duplicated messages, duplicated MACs).

In some embodiments, valid and invalid messages may be identified by validating a message authentication codes (MACs) values included in messages received by the node, wherein a MAC value may be generated based on a freshness value defined by time, counters, etc. In some embodiments, validating a MAC value may include comparing the freshness value to a time window. In some embodiments, validating a MAC value may include recalculating the MAC (based on the freshness and the content of the message) and comparing the recalculated MAC to the received MAC.

In some embodiments, in failsafe mode, some messages may be authenticated as valid while including an invalid MAC, for example if the timing information is valid then a message with invalid MAC may be accepted.

Figure 4:
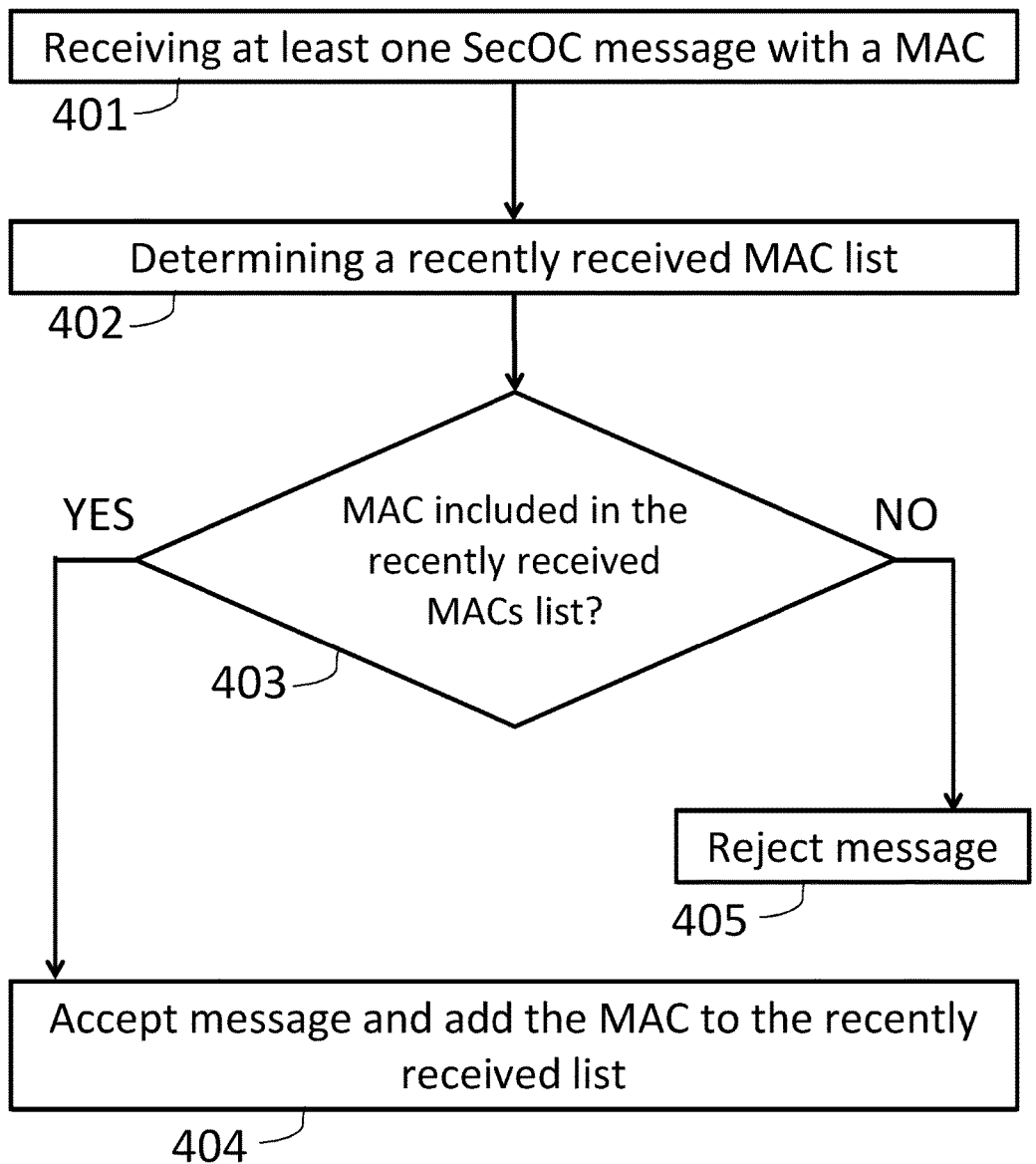
FIG. 4 shows a flowchart of a method of detecting attacks on in-vehicle networks, according to some embodiments of the invention.

Reference is made to FIG. 4, which shows a flowchart of another method of detecting attacks on in-vehicle networks, according to some embodiments of the invention. At least one SecOC message may be received 401 with a MAC, and a list of recently received MACs may be determined 402.

In some embodiments, the processor or node may check 403 if the received MAC included in the massage corresponds to the recently received MACs list. In some embodiments, a receiving node may accept 404 the message and add the received MAC to the list if the received MAC corresponds to the recently received MACs list. In some embodiments, a receiving node may keep a list of recently received MACs and may reject 405 a message that includes a MAC that was already recently received by this node.

In some embodiments, a counter value may be added to the messages. The sender may keep a message counter and may include this counter in the messages. A receiving node may keep a list of recently received counters and may reject a message that includes a counter that was already recently received by this node. In some embodiments, a list of recently received MACs or counters may be implemented by a ring buffer. It may also be implemented by using a hash map. The MACs and/or counters may be stored in the list according to the message ID associated with the MAC or counter.

In some embodiments, the receiving node may use the list of recently received MACs and/or counters in order to derive a confidence level associated with each incoming message. In some embodiments, determining confidence level of a message being valid may be based on a value of a code in the message and/or may be based on the number of preceding messages that included the same code value.

For example, a message may be considered valid with a high degree of confidence if the MAC or counter value associated with it is not included in the recent MAC or counter list. Another example may be that the message may be considered valid with a low degree of confidence if the MAC and/or counter value associated with it is included in the recent MAC or counter list. In another example, the confidence level of a message may be derived from the number of recently received messages that included a MAC and/or counter that was included in the recent MACs or counter list. For example, the first such message may still be considered valid with a relatively high confidence level, while after receiving ten messages within a predefined time window that include a MAC and/or a counter value that is included in the recent MACs or counters list, the receiving node may regard these messages as valid with a low degree of confidence. In some embodiments, the receiving node may decide to reject messages with a low degree of confidence. In some embodiments, the receiving node may use a confidence threshold in order to determine whether a message should be rejected or not.

According to some embodiments, the aforementioned methods may be carried out on at least one monitoring node of in-vehicle network. The monitoring node may read a subset of the in-vehicle messages and check for indications of replay attacks. Once the monitoring node has detected a replay attack, it may perform an action based on that detection. The action may include, in some embodiments, logging this event, blocking the message, notifying other nodes about this detection, sending a signal on the bus in order to cause other network nodes to disregard the message, etc.

According to some embodiments, an efficient freshness synchronization mode may be used for validation of messages. In some embodiments, SecOC may be implemented to include the least significant bits (LSB) of the freshness value in the message so that the receiver may use this information in order to use the exact freshness value in the MAC validation process.

In some embodiments, the most significant bits (MSB) of the freshness value may be used in the MAC calculation, and not include any freshness information in the message itself. Not including this freshness values in the message may allow for less truncation of the MAC hash result, which may increase the security level of the SecOC mechanism. The acceptance window may then be derived by the number of freshness bits that are left out of the MAC calculation In some embodiments, a time broadcasting mode may be used for detecting attacks of in-vehicle networks. The SecOC mechanism may use a secure time as freshness value in order to prevent replay attacks. The secure time may be broadcasted to the network nodes from one or more network nodes. In some embodiments, determining a message is invalid may be based on a frequency of message of a specific type such as time broadcasting messages. In some embodiments, an attacker may broadcast time by pretending to be a time server, which may create too many time-messages on the network and thereby allowing anomaly detection due to change in content of time messages (received from two different sources now).

In some embodiments, an attack may attempt to manipulate the secure time by for example setting the vehicle time in the future, in the past, slowing it down or making it run faster. Such manipulations may allow for a longer window of opportunity for the attacker to perform replay attacks. Such manipulations may also cause one part of the in-vehicle network to maintain one time while another part of the in-vehicle network may maintain a different time. Such time discrepancies may cause SecOC communication between these at least two in-vehicle network parts to fail.

In some embodiments, a network node may attempt to detect such manipulation of the time by checking for irregularities in the secure time broadcast. For example, a network node may detect such manipulation based on a timing and/or a content model for the secure time message. This may include checking if the frequency of the secure timed messages corresponds to the specification. For example, this may include checking that the time lapse between a received (e.g., secure time) message and the previously received (e.g., secure time) message is not less than a predefined threshold. In some embodiments, this may include checking that time is not progressing back more than once in a predefined time window. For example, this may include checking that the time is progressing forward at a rate that matches the internal clock rate or is within a predefined distance from it. In some embodiments, determining that a progress of a time value in a set of messages may be carried out according to a predefined constraint (e.g., time is moving forward, at a known rate, backwards only once in every 'X' messages and/or during a 'Y' seconds window). In some embodiments, verifying a time value may be based on a source other than the message (e.g., an external source).

In some embodiments, a network node may keep track of several received secure time messages and analyze them for discrepancies and irregularities. For example, a network node may make sure that these set of secure time messages indicate that time is generally progressing forward. Such network node may make sure that these set of secure time messages indicate that time is progressing at the proper rate, for instance based on an internal clock.

In some embodiments, a network node may compare the received secure time with a secondary time source. The secondary time source may include for example GPS time, cellular time, etc. The network node may accept only time values which are valid in comparison to the secondary source. Additionally, the vehicle network may broadcast the secure time from more than one source may be using a different message ID for each source. In some embodiments, the vehicle network may broadcast the secure time from one source but more than once, each using different message IDs and/or any different property that may help differentiate between them, for example different shared encrypted message (or secret), different hash function, different freshness and the like. In some embodiments, the network node may accept the time value of a message only if those different values match.

According to some embodiments, MAC guessing mode may be used for detecting attacks of in vehicle networks. An attacker may attempt to guess the correct MAC by flooding the network with messages of different MAC values in the hope of finding the correct MAC value. In some embodiments, a security layer may be put in place that may read in-vehicle messages and detect such attempt at guessing the MAC. For example, such a security layer may look for an increase in the rate of messages. The system may look for an increase in the rate or number of invalid SecOC messages. In another example, the system may look for an increase in the rate or number of SecOC messages that carry the same or similar payload but with different MAC values.

In some embodiments, once detected, the security layer may alert other nodes in the network. In some embodiments, it may block such messages from affecting or reaching network nodes. In some embodiments, such a security layer implemented on a network node may decide to drop such messages and not process them further by the node. In some embodiments, such a security layer implemented on a network gateway may decide to block such messages from being gated to other in-vehicle segments or networks. In some embodiments, the system may decide to block a network node from communicating over the in-vehicle network. In some embodiments, in a case of alert, a channel between two network nodes may be reset by resetting the MAC.

Unless explicitly stated, the method embodiments described herein are not constrained to a particular order in time or chronological sequence. Additionally, some of the described method elements may be skipped, or they may be repeated, during a sequence of operations of a method.

Various embodiments have been presented. Each of these embodiments may of course include features from other embodiments presented, and embodiments not specifically described may include various features described herein.

The invention claimed is:

1. A method of detecting attacks on a communication authentication layer of an in-vehicle network performed by an Electronic Control Unit (ECU), the method comprising:
    determining, by at least one network node, at least one attack attempt on the communication authentication layer of the in-vehicle network, wherein the determination is carried out by identifying anomalies in at least one of messages, data and metadata directed to the communication authentication layer wherein the attack attempt is determined based on one of:
    identifying a time value in a set of messages is progressing backward more than once in every predefined numbers of messages,
    identifying a time value in a set of messages is progressing forward at a rate that is other than a known rate; and
    selecting, by the at least one network node, a response corresponding to the determined attack attempt, said response selected from at least one of:
    modification of parameter values corresponding to the communication authentication layer;
    a failsafe response; and
    rejection of messages identified as anomalies.

2. The method of claim 1, further comprising counting, by the at least one network node, the number of valid messages and the number of invalid messages received by the node during a predefined time interval, wherein the response is selected if the number of valid messages is less than a first threshold and the number of invalid messages is greater than a second threshold for the predefined time interval.

3. The method of claim 2, wherein the response is selected in accordance with the number of received messages of a predetermined type being greater than a third threshold during the predefined time interval.

4. The method of claim 1, further comprising counting, by the at least one network node, the number of valid messages and the number of invalid messages received by the node during a predefined time interval, wherein the response is selected in accordance with a ratio of number valid messages to number of invalid messages.

5. The method of claim 1, comprising identifying a message as an anomaly based on identification, in the message, of a code from a previously received message.

6. The method of claim 1, comprising identifying a message as an anomaly based on identification of a change in a frequency of received messages, wherein the change in frequency exceeds a predefined threshold.

7. The method of claim 1, further comprising determining a confidence level of a message being valid based on a code in the message and based on one or more codes included in one or more previously received messages, wherein if the confidence level is below a confidence level threshold the message is identified as an anomaly.

8. The method of claim 1, comprising determining at least one pattern of messages, wherein the response is selected in accordance with determination of a predetermined pattern of messages characterized by at least one of: a sequence of message types and a time interval between messages.

9. The method of claim 8, wherein the response is selected in accordance with determination of a pattern of messages being different from a predetermined pattern.

10. The method of claim 1, wherein the response is selected in accordance with detection of a deviation from an expected behavior, wherein the deviation is detected based on at least one of: a timing model and a content model.

11. The method of claim 1, further comprising sending a message to at least one node of the network, wherein the sent message comprises at least one of: an indication of a detected security risk and an indication of the selected response.

12. The method of claim 11, wherein the sent message further comprises an indication of the type of the identified anomaly.

13. The method of claim 1, comprising selecting predefined normal mode response based on identification of at least one of: a predefined event, a predefined time interval and a predefined command.

14. The method of claim 1, further comprising performing at least one of: logging a message identified as an anomaly, blocking a message identified as an anomaly, and sending a signal on a communication bus to cause network nodes to disregard the message.

15. The method of claim 1, wherein the response is selected in accordance with detection of a deviation from an expected time value progression in a plurality of secured time messages.

16. A system for detection of at least one attack on a communication authentication layer of an in-vehicle network, the system comprising:
- at least one processor included in an Electronic Control Unit (ECU); and
- at least one electronic control unit, coupled to the processor and configured to communicate with the processor via the communication authentication layer,
- wherein the processor is configured to determine at least one attack attempt on the communication authentication layer by identifying anomalies in at least one of messages, data and metadata directed to the communication authentication layer, wherein the attack attempt is determined based on one of:
- identifying a time value in a set of messages is progressing backward more than once in every predefined numbers of messages,
- identifying a time value in a set of messages is progressing forward at a rate that is other than a known rate, and
- wherein the processor is configured to respond to an attack attempt by at least one response selected from:
- modification of parameter values corresponding to the communication authentication layer;
- a failsafe response; and
- rejection of messages identified as anomalies.

17. The system of claim 16, further comprising a communication module, coupled to the processor and configured to communicate with external devices.

* * * * *